C. WILLIS.
GEAR AND WHEEL PULLER.
APPLICATION FILED MAR. 13, 1920. RENEWED JAN. 30, 1922.
1,409,506.
Patented Mar. 14, 1922.
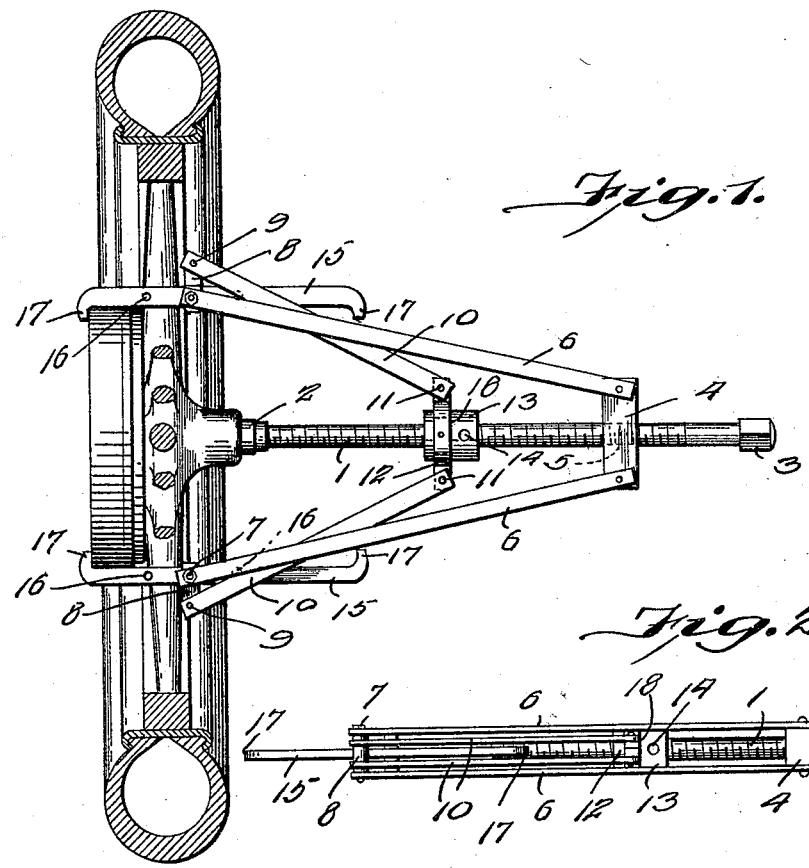
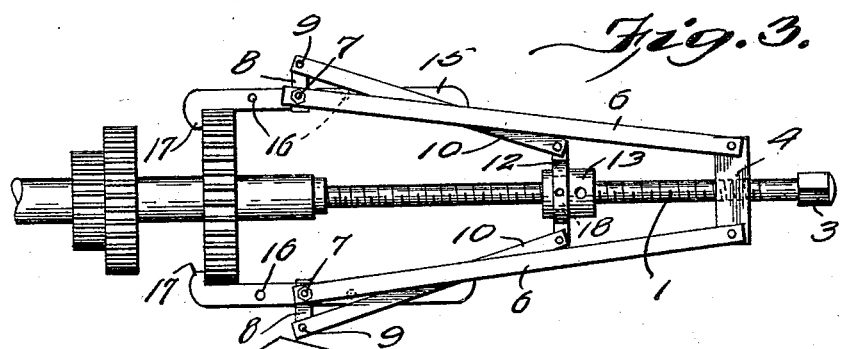

UNITED STATES PATENT OFFICE.

CHARLES WILLIS, OF VINCENNES, INDIANA, ASSIGNOR OF ONE-HALF TO LEO M. BARRETT, OF INDIANAPOLIS, INDIANA.

GEAR AND WHEEL PULLER.

1,409,506.      Specification of Letters Patent.      Patented Mar. 14, 1922.

Application filed March 13, 1920, Serial No. 365,429. Renewed January 30, 1922. Serial No. 532,858.

*To all whom it may concern:*

Be it known that I, CHARLES WILLIS, a citizen of the United States, residing at Vincennes, in the county of Knox and State of Indiana, have invented a new and useful Gear and Wheel Puller, of which the following is a specification.

The object of my invention is to provide a novel garage tool, for use on gears and wheels or for any kind of machine work where a puller implement is required. I attain the objects of my invention by the mechanism illustrated in the accompanying drawings, in which:

Fig. 1 is a side elevation of my gear and wheel puller, applied to a wheel;

Fig. 2 is an edge view of my device;

Fig. 3 is a side elevation of my gear wheel puller applied to a gear; and

Fig. 4 is a detailed perspective of member 8.

Like numerals designate like parts in each of the views.

Referring to the accompanying drawings, I provide a heavy screw 1, threaded for substantially its entire length and having a swivel joint bearing 2 mounted on one end and a bolt head 3 on the other end, to permit of its being operated by a wrench. I provide an adjustable head member 4, having a threaded opening 5, permitting of its being adjustably mounted on screw 1. Pivotally mounted on the ends of member 4 are long pairs of arms 6, the lower ends of which are pivotally attached at 7 to hook bar holding members 8. Members 8 are provided with apertured arms 9, which extend between and are pivotally attached to the respective pairs of shorter arms 10. Arms 10 have their upper ends pivotally attached to the projecting ends 11 of swivel ring member 12, which is swivelly mounted in a suitable annular groove 18 on the capstan nut 13. Capstan nut 13 is provided with spaced openings 14, as a means for turning that member.

I provide hook bars 15, adjustably mounted between arms 7 of each of the members 8. Bars 15 are provided with suitable hooked ends 17; and also with spaced openings 16 which permit of adjustably mounting the hooks on members 8. Hook bar 15 is held rigid by and moves with members 8, the latter members being pivotally attached to both arms 6 and arms 10 and being moved in unison with the movement of those arms.

The operation of the invention is disclosed in the accompanying drawings, in which, in Fig. 1, the device is shown in extended position, applied to a wheel, with the swiveled joint bearing 2 bearing against the hub of the wheel while hook ends 17 engage the member to be pulled on to the hub. In Fig. 3, the device is shown in a more contracted position, applied to a gear which is being pulled off from a shaft on which it is mounted. This operation is accomplished by turn screw 1, by means of applying a wrench to the head 3. It is within the contemplation of my invention to provide any suitable head 3, such as a cross-bar head, if so desired.

The tool can be built with two, three or four arm puller; also members 4, 8, 13, 17 and 18 can be made of forged steel or casted malleable iron.

What I claim is:

1. In a gear and wheel puller, the combination of a screw, a bearing on one end of the screw, means on the other end of the screw for turning same, an adjustable head member mounted on the screw, a capstan nut adjustably mounted on the screw and disposed between the adjustable head member and the swivel bearing, oppositely disposed hook bars, hook bar holding members, long arms operatively connecting the inner ends of said hook bar holding members with the adjustable head member, and shorter arms operatively connecting the capstan nut with the outer portion of the hook bar holding members, whereby to adjustably control the operation of the hook bars.

2. In a wheel and gear puller, the combination of a screw, means for turning same, a swivel bearing on the end of the screw, a plurality of hook bars, means for holding said hook bars, a plurality of arms operatively connecting the aforesaid hook bar holding means with a plurality of threaded members adjustably mounted on the screw, one of said threaded members having means for rotating same, and a ring swivelly mounted on said latter adjustable member and connecting same with one of the sets of arms, substantially as shown.

3. In a gear and wheel puller, the combination of a screw having a head, a swivel bearing on the other end of the screw, a block threaded on the screw, arms pivoted on said block, a hook bar holding member to the inner ends of which said arms are pivotally connected, shorter arms pivotally connected to the outer end of said hook bar holding member and crossing the long arms, a grooved capstan nut, a ring loosely mounted in said groove to which the shorter arms are pivotally connected, and suitable hook bars mounted on the hook bar holding members, substantially as set forth.

CHARLES WILLIS.